United States Patent
Hodges et al.

(12)

(10) Patent No.: US 11,047,411 B2
(45) Date of Patent: Jun. 29, 2021

(54) CLAMPING MIRROR LIGHT

(71) Applicant: Pro Moto Billet, Inc., Nampa, ID (US)

(72) Inventors: Lynn Hodges, Nampa, ID (US); Daniel Larkin, Folsom, CA (US); Blake Wasden, Nampa, ID (US)

(73) Assignee: PRO MOTO BILLET, INC., Nampa, ID (US)

( * ) Notice: Subject to any disclaimer, the term of this patent is extended or adjusted under 35 U.S.C. 154(b) by 0 days.

(21) Appl. No.: 16/741,587

(22) Filed: Jan. 13, 2020

(65) Prior Publication Data

US 2020/0248734 A1 Aug. 6, 2020

Related U.S. Application Data

(60) Provisional application No. 62/801,806, filed on Feb. 6, 2019.

(51) Int. Cl.

| *F21V 21/088* | (2006.01) |
| *F16B 5/06* | (2006.01) |
| *F21S 43/19* | (2018.01) |
| *F21S 43/14* | (2018.01) |
| *F21S 43/37* | (2018.01) |
| *A45D 42/10* | (2006.01) |
| *F21W 103/20* | (2018.01) |
| *F21Y 115/10* | (2016.01) |

(52) U.S. Cl.
CPC ............ *F16B 5/0607* (2013.01); *A45D 42/10* (2013.01); *F21S 43/14* (2018.01); *F21S 43/195* (2018.01); *F21S 43/37* (2018.01); *F21V 21/088* (2013.01); *F21W 2103/20* (2018.01); *F21Y 2115/10* (2016.08)

(58) Field of Classification Search
CPC ........ F21V 21/08; F21V 21/088; A45D 42/10

USPC ......................... 362/128–129, 135–144, 396
See application file for complete search history.

(56) References Cited

U.S. PATENT DOCUMENTS

| 2,595,331 A | 5/1952 | Calihan et al. |
| 2,950,836 A | 8/1960 | Murdock |
| 5,112,015 A | 5/1992 | Williams |
| 5,180,220 A * | 1/1993 | Van Kalsbeek ....... F21V 21/088 |
| | | 362/253 |

(Continued)

FOREIGN PATENT DOCUMENTS

CN          205651109 U       10/2016

OTHER PUBLICATIONS

PCT/US2020/016950, "Notification of Transmittal of the International Search Report and the Written Opinion of the International Searching Authority, or the Declaration", PCT International Searching Authority, dated Apr. 7, 2020, pp. 1-10.

*Primary Examiner* — Sean P Gramling
(74) *Attorney, Agent, or Firm* — Kunzler Bean & Adamson

(57) ABSTRACT

A universal clamp including a first jaw, a guide, a fixed jaw, an adjustment mechanism, and a coupler. The first jaw has a first clamping face. The guide is coupled to the first jaw. The second jaw has a second clamping face. The second jaw is adjustably connected to the guide to move relative to the first jaw with the first clamping face oriented to face the second clamping face. The adjustment mechanism adjusts and secures the first jaw relative to the second jaw. The coupler is connected to at least one of the first jaw and the second jaw. The coupler is configured to facilitate attachment of a structure to the universal clamp.

8 Claims, 9 Drawing Sheets

(56) References Cited

U.S. PATENT DOCUMENTS

| | | | |
|---|---|---|---|
| 5,664,875 A * | 9/1997 | Hegedus | F21V 21/08 248/228.6 |
| 5,984,496 A | 11/1999 | Malcomson | |
| 8,020,829 B1 | 9/2011 | Tamayori | |
| 2014/0198515 A1 | 7/2014 | Tulio et al. | |

* cited by examiner

CLAMPING MIRROR LIGHT

CROSS-REFERENCES TO RELATED APPLICATIONS

This application claims the benefit of U.S. Provisional Patent Application No. 62/801,806 entitled "CLAMPING MIRROR LIGHT" and filed on 6 Feb. 2019 for Lynn Hodges et al, which is incorporated herein by reference.

FIELD

This invention relates to clamp-mounting accessories and more particularly relates to a clamping mirror light.

BACKGROUND

Accessories provide increased functionality or improved user experience through the incorporation of standalone or supplemental equipment in addition to standard equipment or as a replacement for standard equipment. Accessories may be coupled to existing mounting locations or may include mounting hardware which facilitates mounting of the accessory.

SUMMARY

A universal clamp including a first jaw, a guide, a fixed jaw, an adjustment mechanism, and a coupler. The first jaw has a first clamping face. The guide is coupled to the first jaw. The second jaw has a second clamping face. The second jaw is adjustably connected to the guide to move relative to the first jaw with the first clamping face oriented to face the second clamping face. The adjustment mechanism adjusts and secures the first jaw relative to the second jaw. The coupler is connected to at least one of the first jaw and the second jaw. The coupler is configured to facilitate attachment of a structure to the universal clamp.

A system is also disclosed. The system includes a universal clamp and a mirror light. The universal clamp is adjustable to clamp to a plurality of mounting structures each having a different geometry at a clamping location. The universal clamp includes a first jaw, a guide, a fixed jaw, an adjustment mechanism, and a coupler. The first jaw has a first clamping face. The guide is coupled to the first jaw. The second jaw has a second clamping face. The second jaw is adjustably connected to the guide to move relative to the first jaw with the first clamping face oriented to face the second clamping face. The adjustment mechanism adjusts and secures the first jaw relative to the second jaw. The coupler is connected to at least one of the first jaw and the second jaw. The coupler is configured to facilitate attachment of a structure to the universal clamp. The mirror light is coupled to the universal clamp. The mirror light includes a base, a mirror, a first lighting element, and a second lighting element. The base includes a first side and a second side opposite the first side. The mirror is disposed on the first side of the base. The first lighting element is disposed on the second side of the base. The second lighting element is disposed on the second side of the base and is oriented at an angle relative to the first lighting element.

A method is also disclosed. The method includes forming a first jaw having a first clamping face. The method also includes forming a second jaw having a second clamping face. The method also includes disposing a guide to position the first jaw relative to the second jaw and allow the first jaw to move relative to the second jaw, the first clamping face oriented to face the second clamping face. The method also includes aligning an adjustment mechanism to adjust and secure the first jaw relative to the second jaw. The method also includes connecting a coupler to at least one of the first jaw and the second jaw, the coupler shaped to facilitate attachment of a structure to the universal clamp.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Embodiments described herein relate to a clamping mirror light for use with a vehicle. Embodiments of the clamping mirror light provide an adjustable viewing mirror with an integrated light source to provide illumination over a wider angle without the need for installing and calibrating multiple mountable components.

Figure 1:
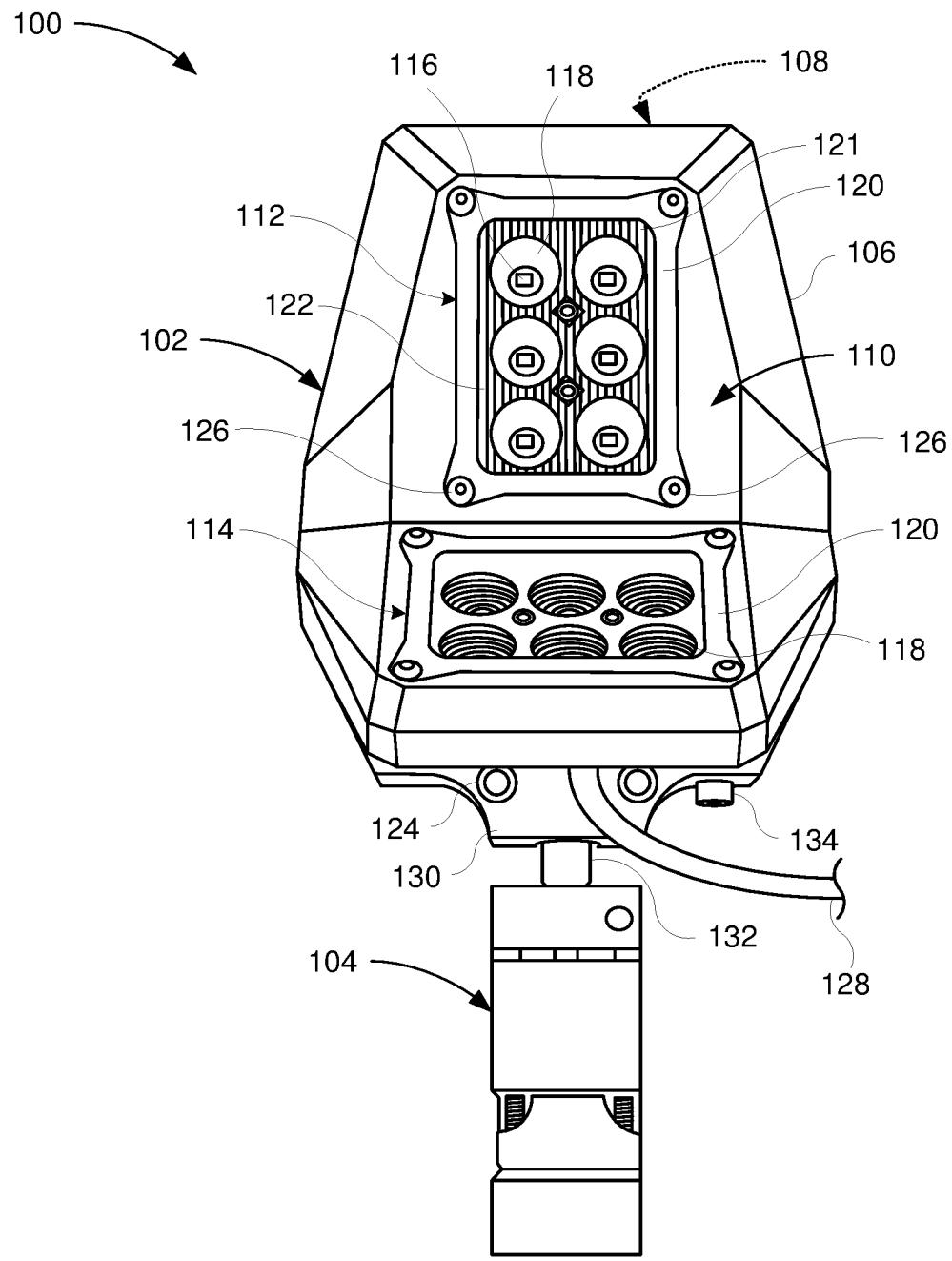
FIG. 1 is a front perspective view illustrating one embodiment of a system.

FIG. 1 illustrates an elevation view of a clamping mirror light 100. The clamping mirror light 100 includes a mirror light 102 and a universal clamp 104. The mirror light 102 includes a base 106. The base 106 includes a first side 108 and a second side 110 which is opposite the first side 108. In the illustrated embodiment, the second side 110 is visible while the first side 108 is positioned on the opposite side of the mirror light 102 and is not directly shown in FIG. 1.

In some embodiments, the mirror light 102 includes a mirror disposed on the first side 108 to provide visibility for a driver or other occupant of a vehicle. The mirror light 102 further includes a first lighting element 112 disposed on the second side 110 of the base 106. The mirror light 102 also includes a second lighting element 114. The second lighting element 114 is disposed on the second side 110 of the base 106 and is oriented at an angle relative to the first lighting element 112. The relative angle of the first lighting element 112 and the second lighting element 114 may provide lighting over a wider range that which may be achieved with the standard onboard lighting of a vehicle and wider than what may be achieved by other stand-alone systems.

In some embodiments, at least one of the first lighting element 112 and the second lighting element 114 is an array or bank of a plurality of light sources 116. In some embodiments, the first lighting element 112 is a flat bank of light sources 116 with the light sources 116 all positioned to direct light in the same direction. Similarly, some embodiments of the second lighting element 114 form a flat bank of light sources 116 to direct light in a direction that is angled relative the that of the first lighting element 112.

In the illustrated embodiment, the first lighting element 112 and the second lighting element 114 each include six light sources 116. In other embodiments, the first lighting element 112 and the second lighting element 114 each include fewer than six light sources 116. In some embodiments, the first lighting element 112 and the second lighting element 114 each include more than six light sources 116.

The first lighting element 112 and the second lighting element 114 may include a similar or disparate number of light sources 116. For example, the first lighting element 112 may include fewer light sources 116 than the second lighting element 114. In some embodiments, different colors, fluxes, patterns, or the like may be incorporated into one or both of the first lighting element 112 and the second lighting element 114. For example, one or more of the light sources 116 may provide turn signal lighting, high beam lighting, spot lighting, flood lighting, or the like.

While each of the first lighting element 112 and the second lighting element 114 is shown as a single unified bank of light sources 116, other embodiments may separate one or both of the first lighting element 112 and the second lighting element 114 into separate sub-arrays or individual light sources 116 pointing in the direction of the corresponding one of the first lighting element 112 and the second lighting element 114. For example, in the illustrated embodiment, the first lighting element 112 includes all of the corresponding light sources 116 in a single housing 120 while in other embodiments, the first lighting element 112 includes light sources 116 in separate housings 120 with the light sources 116 of each housing pointing in the same direction. In the illustrated embodiment, the light sources 116 are arranged in a rectangular 2×3 format for both the first lighting element 112 and the second lighting element 114. In other embodiments, the light sources 116 may be arranged in other patterns, shapes, elevations, or the like.

In the illustrated embodiment, each light source 116 is associated with a reflector 118. The reflector 118 may be an individual component associated with a single light source 116 or each reflector 118 may be associated with a plurality of light sources 116. In some embodiments, each reflector 118 may be coupled to a reflector plate 122 which may have different surface features, textures, or the like. Each reflector 118 may be removeable from, or may be permanently integrated with, the reflector plate 122.

Additionally, at least one of the first lighting element 112 and the second lighting element 114 may include an optic 121. In one example, the optic 121 is a transparent or semi-transparent material. The optic 121 may be positioned to correspond to one or more of the plurality of light sources 116. For example, the optic 121 may be a lens spanning multiple of the plurality of light sources 116 or may be disposed in or relative to the reflector 118 of a single one of the plurality of light sources 116.

In some embodiments, the optic 121 has no effect on the light dispersion and form from the corresponding light source 116. In other embodiments, the optic 121 applies an optical effect. For example, the optic 121 may disperse the light, focus the light, redirect the light, or the like. The optic 121 may be a lens, plate, or the like.

In some embodiments, each reflector 118 in the first lighting element 112 is similar. In other embodiments, one or more reflectors 118 in the first lighting element 112 is different from another reflector in the first lighting element 112. For example, the reflector 118 may provide diffuse or focused light patterns to provide broad or narrow illumination. In some embodiments, the reflectors 118 may be smooth, ridged, textured, or the like to provide a corresponding lighting effect. The reflector 118 may provide illumination patterns having certain geometries such as circular, oval, cut-off, or other geometries that may be more effective, efficient, or otherwise beneficial for particular uses, mounting positions, vehicles, or the like.

In the illustrated embodiment, the housings 120 are coupled to the base 106 with mounting hardware 126. The mounting hardware 126 may include screws, bolts, pins, caps, and the like. The housings 120 may be secured with the mounting hardware 126 alone or may also be secured using adhesives, retaining structures, or the like to further secure the housings 120 relative to the base 106.

In some embodiments, the mounting hardware 126 is configured to facilitate removal of the housings 120. The housings 120 may be removeable to facilitate maintenance, cleaning, or the like. In some embodiments, the housings 120 may be removeable to facilitate swapping at least one of the housings 120, the reflector plates 122, reflectors 118, light sources 116, or other components for an aesthetic, performance, or material repair, update, or other change. For example, the housings 120 may be removeable to allow a user to install a different housing that is similar in color or design to a vehicle on which the clamping mirror light 100 may be used. The housings 120 may also be removable to access one or more internal components of the mirror light 102.

The illustrated embodiment of the mirror light 102 also includes an electrical connection 128. The electrical connection 128 provides electrical power to the mirror light 102. For example, the electrical connection 128 provides electrical power to the light sources 116. The electrical connection 128 may be removeable relative to the base 106 or may be fixedly coupled to the base 106. In the illustrated embodiment, the electrical connection 128 is a single unified cord or cable. In other embodiments, the electrical connection 128 may be a split cord or cable with multiple lines. For example, the electrical connection 128 may be a two-wire open lead to facilitate ease of connecting the mirror light 102.

In some embodiments, the electrical connection 128 provides electrical energy to a single electrical control circuit to control the plurality of light sources 116. In other embodiments, each of a plurality of electrical control circuits is associated with each of the plurality of the light sources 116.

In the illustrated embodiment, the mirror light 102 includes a coupling feature 130. The coupling feature 130 is formed in the base 106 to facilitate coupling of the mirror light 102 to another system, such as the universal clamp 104. Embodiments of the coupling feature 130 accept an attachment feature 132 from an attachable system or device. In the illustrated embodiment, the coupling feature 130 is a ball socket that receives a ball insert to couple the universal clamp 104 to the light mirror 102. In some embodiments, a coupling force or strength of the coupling feature 130 may be adjustable. For example, the coupling feature 130 may include adjustment hardware 134. The adjustment hardware 134 is shown as being positioned to one side of the coupling feature 130 to secure the attachment feature 132 at the coupling feature 130. In other embodiments, the adjustment hardware 134 may be positioned on the opposite side or on both sides of the coupling feature 130. In the illustrated embodiment, the adjustment hardware 134 includes one or more screws, bolts, nuts, levers, or the like.

The adjustment hardware 134 may be tightened, loosened, or otherwise adjusted to modify the force with which the coupling feature 130 engages the attachment feature 132 of the universal clamp 104 or another device. In some embodiments, the adjustment hardware 134 is configured to accept a tool to make the adjustment. In other embodiments, the adjustment hardware 134 is configured to allow a user to make the adjustment without the need for a tool. For example, the adjustment hardware 134 may include a standard or proprietary tool interface or the adjustment hardware 134 may include a hand or finger interface.

The adjustable force aspect of the coupling feature 130 provides a breakaway action. The breakaway action is a response of the light mirror 102 to resist or give way to an outside force encountered by the light mirror 102. For example, if the light mirror 102 is coupled to the universal clamp 104 which secures the light mirror to an off-road vehicle and the off-road vehicle passes by a tree, a tree branch may impact the light mirror 102. The coupling feature 130 may be adjusted to resist movement due to the impact of the tree branch and the light mirror 102 or may be adjusted to give way in response to the impact and move relative to the universal clamp 104.

The coupling feature 130 may be removably secured via coupling hardware 124. In the illustrated embodiment, the coupling hardware 124 is positioned on either side of the coupling feature 130. The coupling hardware 124 may secure separate portions of the coupling feature 130. The coupling hardware 124 may include a tool or hand interface to facilitate installation or removal via a tool or hand interaction.

Figure 2:
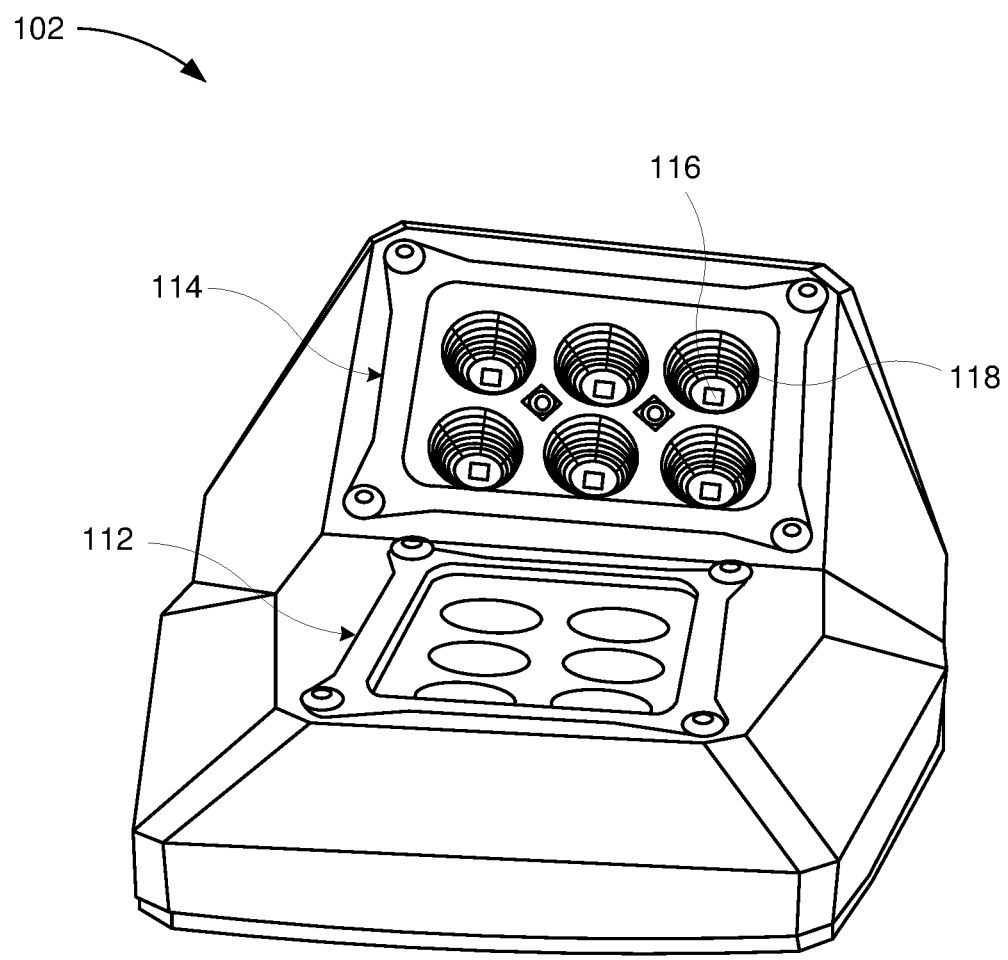
FIG. 2 is a side perspective view further illustrating one embodiment of a mirror of the system of FIG. 1.

FIG. 2 illustrates an end view of one embodiment of the light mirror 102 of FIG. 1. In the illustrated embodiment, the reflectors 118 of the second lighting element 114 are more fully shown. In this embodiment, the reflectors 118 of the second lighting element 114 have a non-smooth geometry. As shown, the reflectors 118 of the second lighting element 114 have a series of radial steps extending outward from the light sources 116 and a series of radial ridges around the circumference of the reflectors 118. This provides a corresponding lighting pattern and throw. While a particular geometry of the reflectors 118 is shown, other geometries and configurations are contemplated.

Figure 3:
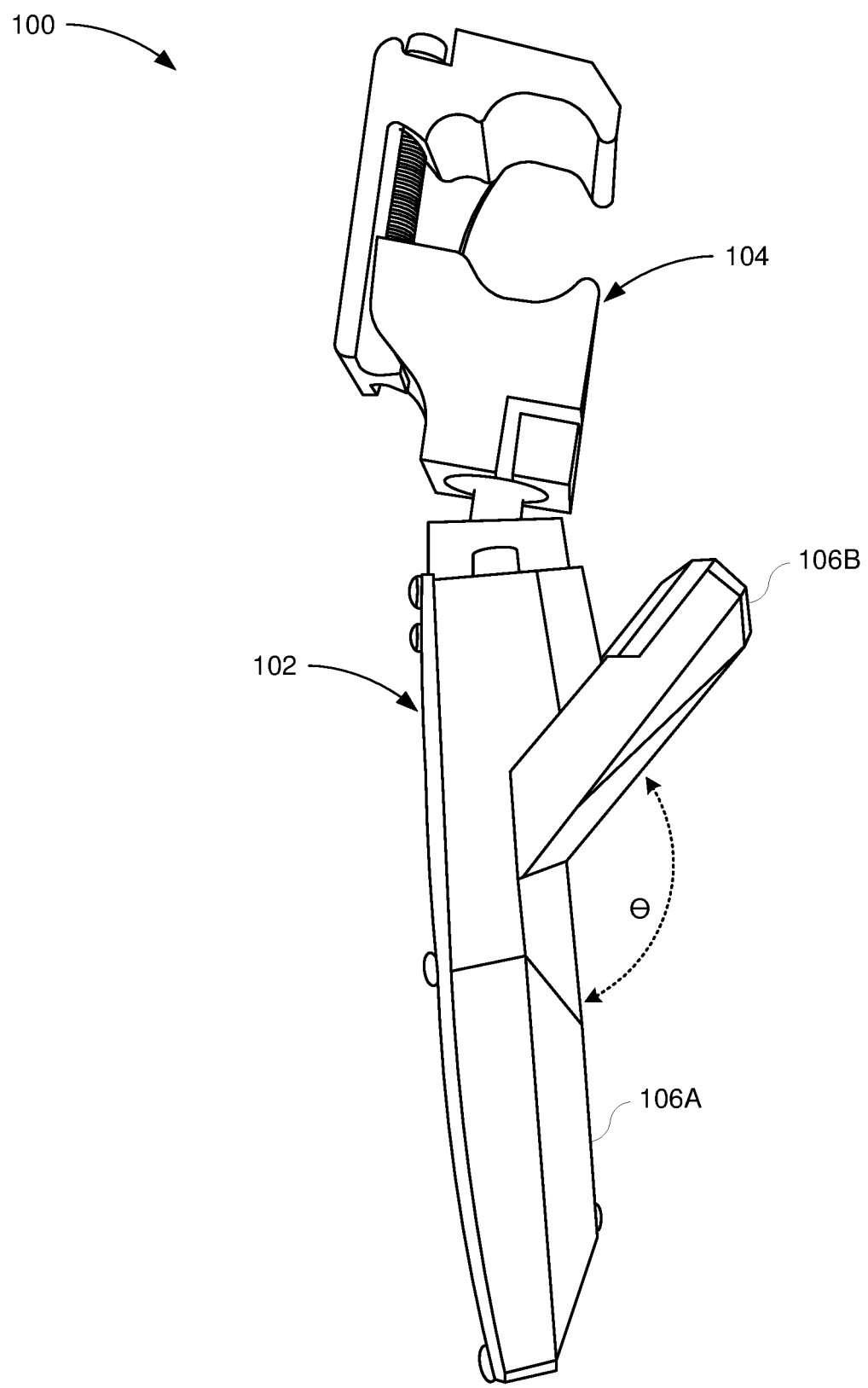
FIG. 3 is a top perspective view illustrating one embodiment of the system of FIG. 1.

FIG. 3 illustrates a side view of the clamping mirror light 100 of FIG. 1. In the illustrated embodiment, a first body portion 106A and a second body portion 106B of the mirror light 102 are shown. In some embodiments, the first body portion 106A corresponds to the first lighting element 112 while the second body portion 106B corresponds to the second lighting element 114. In some embodiments, the first body portion 106A is coupled to the second body portion 106B at an angle, ϴ. The angle ϴ may range between 90° and 180°. In some embodiments, the angle ϴ is approximately 135 degrees. In other embodiments, the angle ϴ is greater than or less than 135 degrees.

In some embodiments, the angle ϴ is adjustable. For example, the second body portion 106B may be pivotable at or near the first body portion 106A to increase or decrease the angle ϴ. The adjustment of the angle ϴ may be stepwise or may be smooth with a locking or other securing capability and corresponding mechanism. While some embodiments show a angling of the housing, other embodiments may incorporate an angling of each of the plurality of light sources 116 via the reflector 118, optic 121, or the like. The angling of the light may produce a fanned or angle effect in one or more directions. For example, the light may be fanned vertically and/or horizontally.

In some embodiments, the first body portion 106A and the second body portion 106B are unified structures formed from the same material. For example, the first body portion 106A and the second body portion 106B may be machined or formed from a single billet, stock, or other raw form. In other embodiments, the first body portion 106A and the second body portion 106B may be joined as part of an assembly process. In some embodiments, at least a portion of the clamping mirror light 100 is machined. In some embodiments, at least a portion of the clamping mirror light 100 is cast, molded, or the like. In the illustrated embodiment, the clamping mirror light 100 includes a faceted planar geometry. In other embodiments, the clamping mirror light 100 includes a smooth or curved geometry or a geometry that is a combination of faceted and curved.

In some embodiments, at least a portion of the clamping mirror light 100 is made from billet aluminum. For example, one or more portions of the clamping mirror light 100 may be made from at least one of a 6061 aluminum, another 6000-series aluminum, a 7000-series aluminum, another grade of aluminum, or other metal, composite, or other natural or synthetic material, or combination of materials. Additionally, components of the clamping mirror light 100 may include coatings, treatments, deposits, hardening, or other processes such as anodization, painting, powder coating, vapor deposition, plasma deposition, thermal treatment, or the like. In some embodiments, like materials are used in contact with one another to avoid issues arising from thermal expansion differences, galvanic coupling, or the like.

In the illustrated embodiment, the angle ϴ of the first body portion 106A relative to the second body portion 106B facilitates a wide area of illumination. In some embodiments, the relative position of the first body portion 106A and the second body portion 106B orients the first lighting element 112 and the second lighting element 114 to generate a combined illuminated field of view of approximately 210°.

Figure 4:
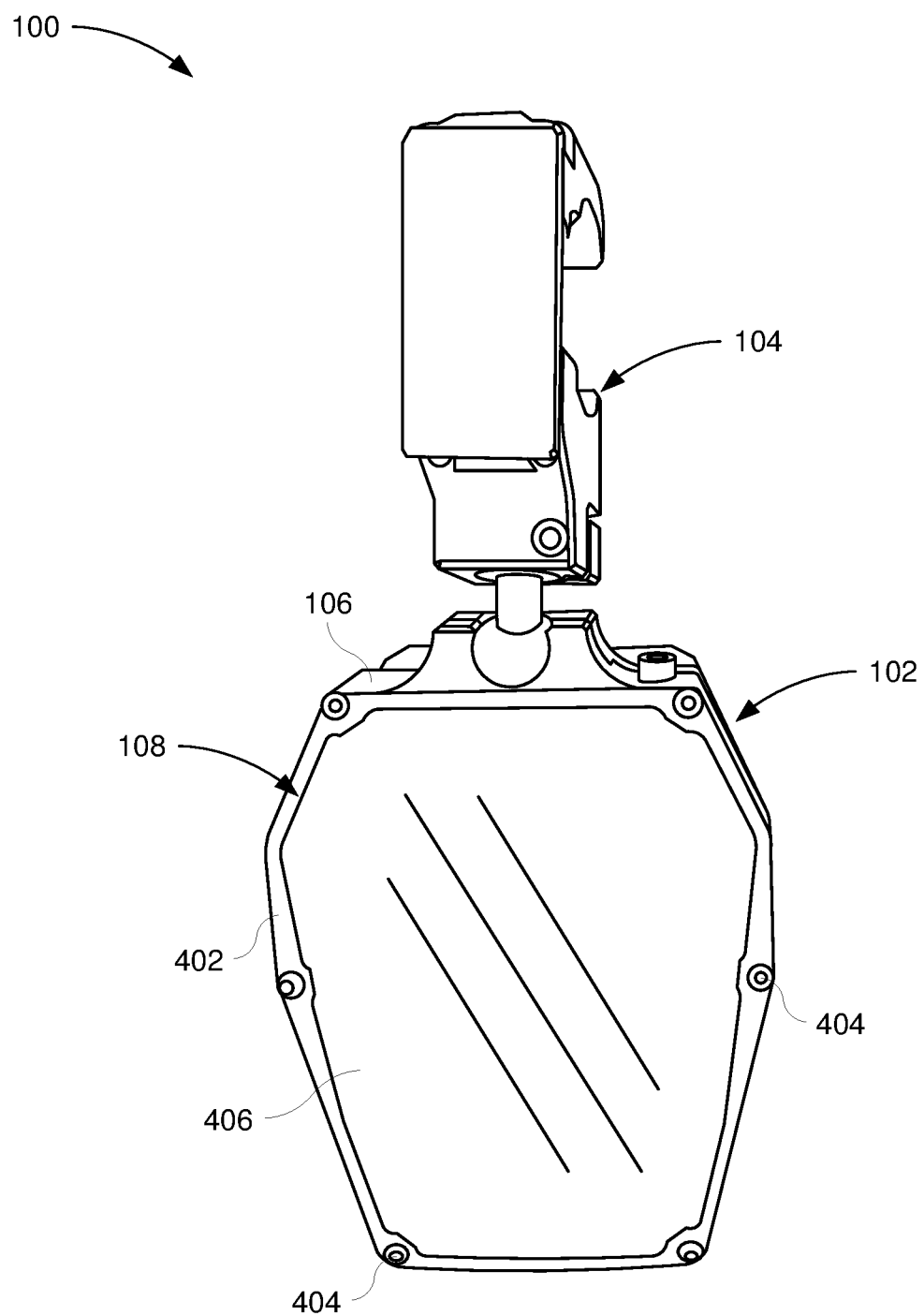
FIG. 4 is a rear perspective view illustrating one embodiment of the system of FIG. 1.

FIG. 4 illustrates a perspective view of one embodiment of the first side 108 of the clamping mirror light 100 of FIG. 1. The illustrated embodiment includes a bezel 402 disposed on the first side 108 of the base 106 of the mirror light 102. In some embodiments, the bezel 402 is secured to the first side 108 of the base 106 with bezel mounting hardware 404. In some embodiments, the bezel mounting hardware 404 is similar to the mounting hardware 126 of FIG. 1 which corresponds to the housings 120 on the second side 110 of the base 106 of the mirror light 100. In other embodiments, the bezel mounting hardware 404 is different from the mounting hardware 126 of FIG. 1.

In some embodiments, the bezel mounting hardware 404 is removable to facilitate removal of the bezel 402. The bezel 402 may be removed to repair a portion of the clamping mirror light 100 or to change a characteristic or quality of the clamping mirror light 100 such as a color, size, or shape of the bezel 402 or to access the light sources 116.

The illustrated embodiment also includes a mirror 406 disposed on the first side 108 of the base 106. In some embodiments, the mirror 406 is a convex mirror or outward-curving mirror to improve the field of view of the mirror 406 and provide an exaggerated size change based on object proximity. In the illustrated embodiment, the mirror 406 is a single-piece mirror 406. In other embodiments, the mirror 406 may be a multi-piece mirror. For example, the mirror 406 may include a concave portion and a flat portion. Other mirror arrangements are contemplated.

Figure 5:
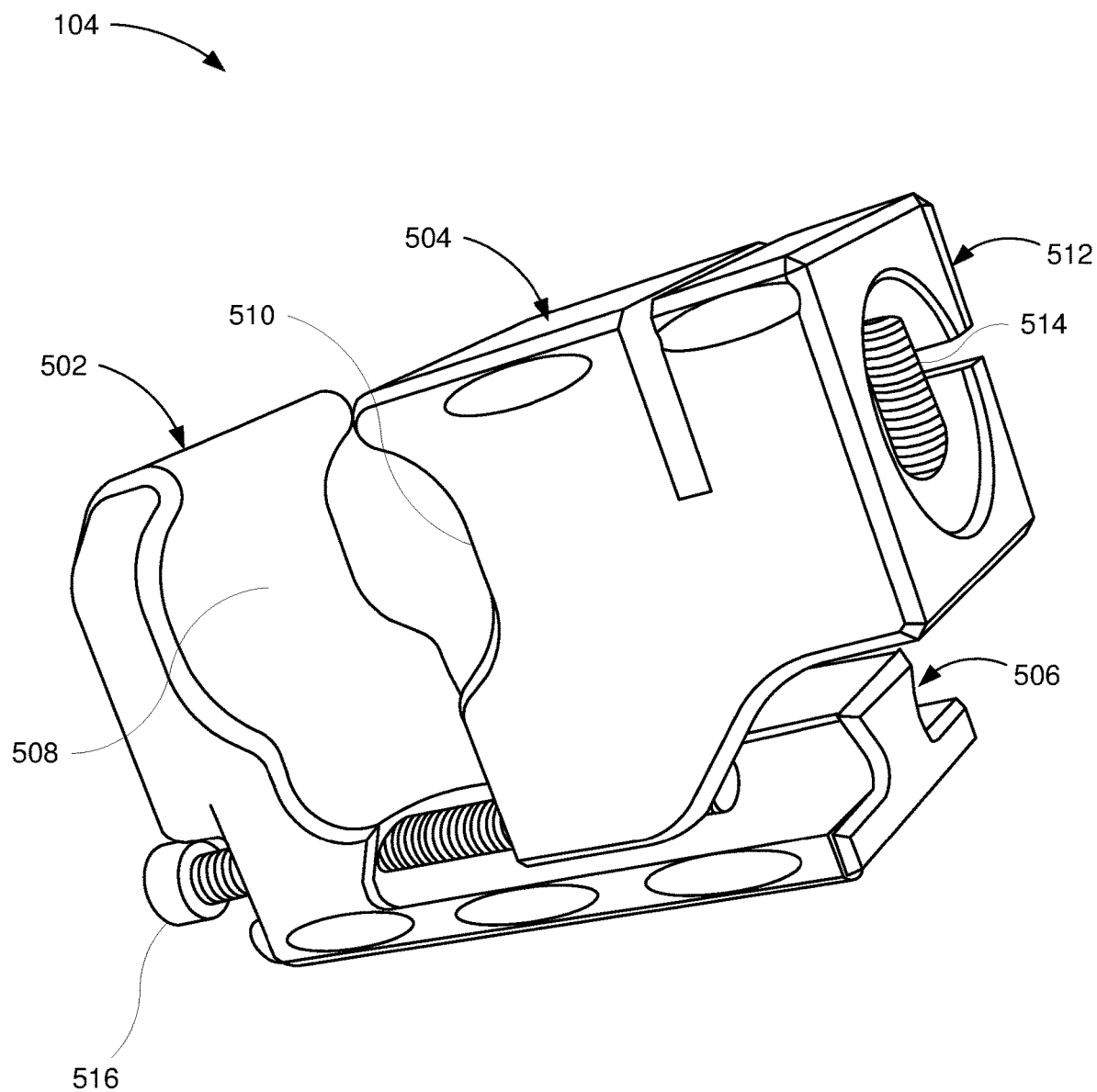
FIG. 5 is a perspective view of one embodiment of the universal clamp of the system of FIG. 1.

FIG. 5 illustrates a perspective view of one embodiment of the universal clamp 104 of FIG. 1. The illustrated embodiment includes a first jaw 502, a second jaw 504, and a guide 506. The guide rail 506 is coupled to the first jaw 502. The first jaw 502 has a first clamping face 508 and the second jaw 504 has a second clamping face 510. The guide 506 is coupled to the first jaw 502. The second jaw 504 is adjustably positioned on the guide 506 to move relative to the first jaw 502 with the first clamping face 508 towards the second clamping face 510.

At least one of the adjustability of the universal clamp 104 and the geometry of the first clamping face 508 and the second clamping face 510 allow the universal clamp 104 to clamp to a wide range of clamping locations. For example, the universal clamp 104 may be compatible with a wide range of ATV frame, vehicle components, or other mounting locations or other structures which may have a wide range of geometries in both size and shape.

The illustrated embodiment also includes a coupler 512 attached to at least one of the first jaw 502 and the second jaw 504. The coupler 512 is shaped to facilitate attachment of a structure to the universal clamp 104. For example, the mirror light 102, a fire extinguisher or another structure, device, or system may couple to the universal clamp 104 via the coupler 512. In some embodiments, the coupler 512 is a friction lock.

In the illustrated embodiment, the first jaw 502 and guide 506 are configured to float relative to the second jaw 504 and the coupler 512. Or, in other words, the adjustability and compatibility of the universal clamp 104 is partly due to the movement of the first jaw 502 or floating jaw 502 relative to the second jaw 504 or fixed jaw 504. The guide 506 is shown as a guide rail 506 but may take other shapes and forms as illustrated in the figures and described below.

Figure 7:
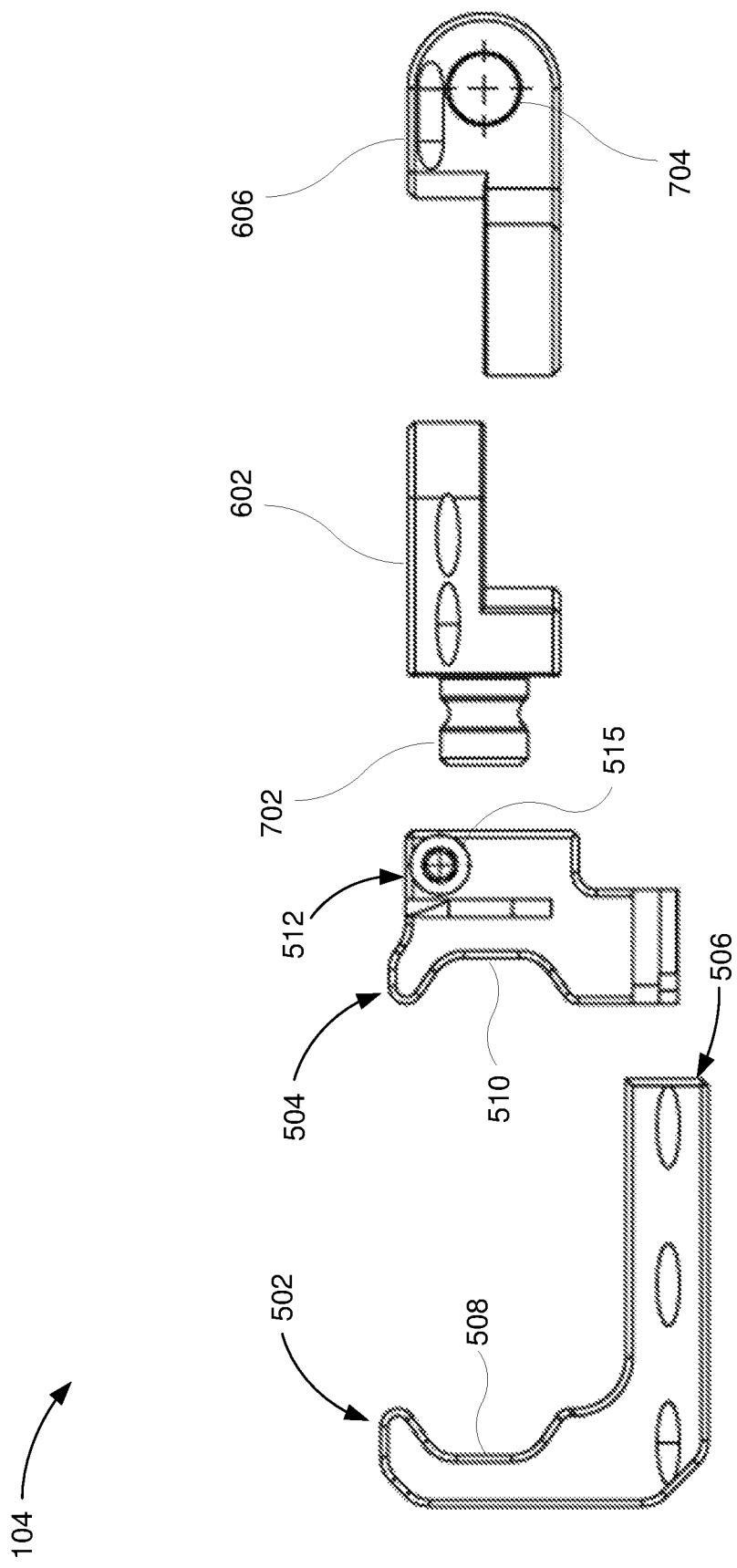
FIG. 7 is an exploded view of the universal clamp of FIG. 6.

In the illustrated embodiment, the coupler 512 includes a securing element which is shown herein as a tension mechanism 514. The securing element may be a screw 515 as shown in FIG. 7, a clamp, a latch, hook, or the like. The illustrated tension mechanism 514 applies a tensioning force to close the coupler 512 to secure a structure or portion of a device or system within the coupler 512. The tension mechanism 514 may be a screw, bolt, nut, or the like. The tension mechanism 514 may facilitate adjustment by hand or with the use of a tool. In the illustrated embodiment, a single tension mechanism 514 is shown. In other embodiments, one or more tension mechanisms 514 to adjust the coupler 512.

The coupler 512 may be adjusted by deflecting the material of the coupler 512 as shown. In other embodiments, the coupler 512 may include a hinge, flexure material, or the like. In some embodiments, the coupler 512 is a smooth-bore opening in the fixed jaw 504. In other embodiments, the coupler 512 includes a grip features such as a rubber, texturing, raised surface features, or the like.

In some embodiments, the coupler 512 is configured to mount at least one of a mirror light 102, flag holders, whip mounts, wind shields, shades, lights, armor, guards, racks, rails, plows, bars, tie downs, turn signals, winches, or the like. In some embodiments, the coupler 512 is configured to receive a fire extinguisher or fire extinguisher mount. In some embodiments, the fire extinguisher mount may be a quick-release fire extinguisher mount to facilitate accessible placement and relatively quick access to a fire extinguisher. Other structures, mechanisms, or objects may be coupled to the universal clamp 104 via the coupler 512.

The illustrated embodiment includes an adjustment mechanism 516. The adjustment mechanism 516 is positioned to adjust and secure the floating jaw 502 relative to the fixed jaw 504. The adjustment mechanism 516 is shown as being positioned alongside the guide rail 506. In this relative arrangement, the adjustment mechanism 516 may adjust a position of the fixed jaw 504 relative to the floating jaw 502 with a reduced likelihood of binding on the guide rail 506. Because the guide rail 506 has a raised key geometry with the fixed jaw 504 having a corresponding key slot geometry, an adjustment force applied away from the guide rail 506 may cause a binding situation without additional stabilization. In the illustrated embodiment, the adjustment mechanism 516 is a screw or bolt. In other embodiments, the adjustment mechanism 516 is a nut, a slider, a locker, or the like.

In some embodiments, the adjustment mechanism 516 is free-spinning in one of the floating jaw 502 and the fixed jaw 504 and engaged with the other of the floating jaw 502 and the fixed jaw 504. In the illustrated embodiment, the adjustment mechanism 516 is free-spinning relative to the floating jaw 502 and is engaged with the fixed jaw 504. As the adjustment mechanism 516 is turned or otherwise manipulated, spacing between the floating jaw 502 and the fixed jaw 504 is increased or decreased. This adjustment allows the first clamping face 508 and second clamping face 510 to come together to grip a structure between the floating jaw 502 and the fixed jaw 504 of the universal clamp 104 or to move apart to release a structure from the universal clamp 104.

Figure 6:
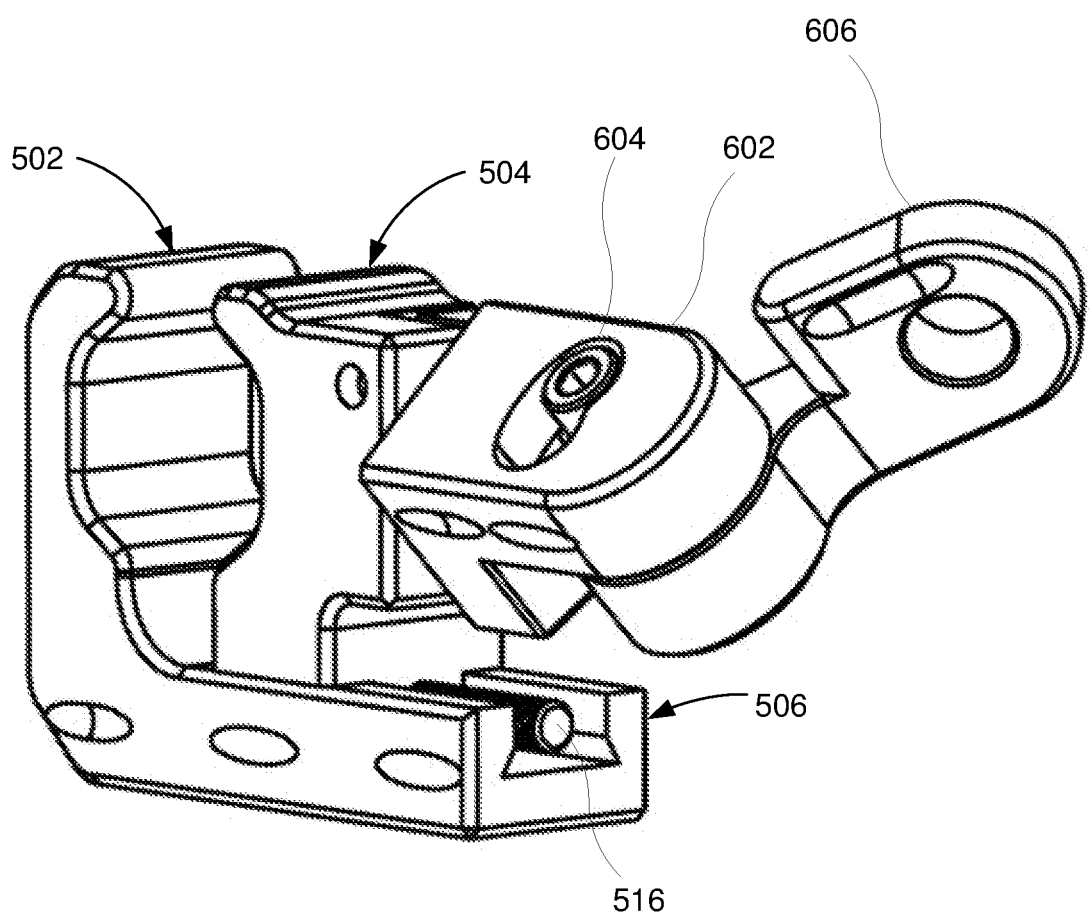
FIG. 6 is a perspective view of another embodiment of the universal clamp of the system of FIG. 1.

FIG. 6 illustrates a perspective view of one embodiment of the universal clamp 104 of FIG. 1. In the illustrated embodiment, the guide rail 506 of the universal clamp 104 is reversed from the embodiment shown in FIG. 5 with the fixed jaw 504 having a key geometry and the guide rail 506 forming a key slot to receive the fixed jaw 504. In the illustrated embodiment, the adjustment structure 516 passes through slot in the guide rail 506 to engage the fixed jaw 504.

The illustrated embodiment includes a pivot spud 602. The pivot spud 602 may be coupled to the fixed jaw 504. The pivot spud 602 may include a male pin which extends into the fixed jaw 504 or may receive a male pin from the fixed jaw 504 to form a pivotable connection with the fixed jaw 504. In some embodiments, the pivot spud 602 is received by the coupler 512 shown in FIG. 5.

The pivot spud 602 may include a slot 604 to facilitate coupling of the pivot spud 602 to a secondary mount 606. In the illustrated embodiment, the slot 604 is formed in the pivot spud 602 to have an arcuate geometry. the arcuate geometry of the slot 604 may allow for a range of adjustability or other relative movement of the secondary mount 606.

The secondary mount 606 may couple to the pivot spud 602 to facilitate mounting of another system such as the mirror light 102 of FIG. 1. Other systems, devices, or structures may also be compatible with the secondary mount 606. For example, one or both of the pivot spud 602 and the secondary mount 606 may be compatible with proprietary or standardized mounts for a range of systems, devices, and structures.

FIG. 7 illustrates an exploded view of one embodiment of the universal clamp 104. In the illustrated embodiment, the first clamping face 508 of the floating jaw 502 and the second clamping face 510 of the fixed jaw 504 are mirrors of one another. In the illustrated embodiment, the first clamping face 508 and the second clamping face 510 have rounded and flat-faced geometries to engage and clamp on to a round structure, a rectangular structure, a flat structure, or the like.

In the illustrated embodiment, the pivot spud 602 include a male pin 702 which engages with the coupler 512 of the fixed jaw 504. As described above, the male pin 702, in some embodiments, may be secured relative to the fixed jaw 504 while allowing the pivot spud 702 to pivot relative to the fixed jaw 504.

In the illustrated embodiment, the secondary mount 606 couples to the pivot spud 602. The secondary mount 606 may be rotatable relative to the pivot spud 602. and includes a mounting aperture 704. The mounting aperture 704 may facilitate coupling of a system, device, or structure to the secondary mount 606. For example, the secondary mount 606 may facilitate connection of the mirror light 102, flag holders, whip mounts, wind shields, shades, lights, armor, guards, racks, rails, plows, tie downs, turn signals, winches, or the like.

Figure 8:
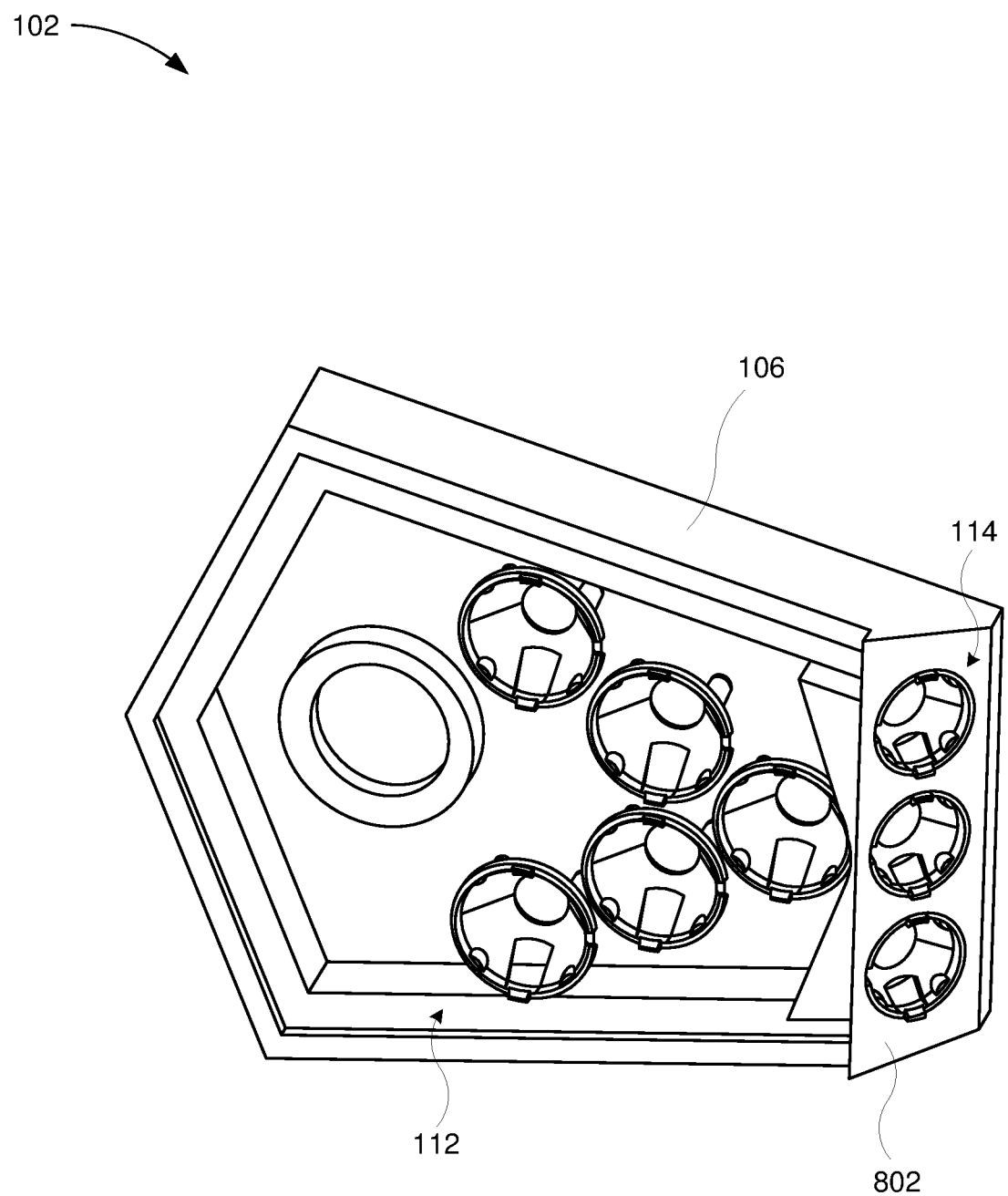
FIG. 8 is a front perspective view of another embodiment of the mirror of the system of FIG. 1.

FIG. 8 is a front perspective view of another embodiment of the mirror 102 of the system 100 of FIG. 1. In the illustrated embodiment, the mirror 102 has a base 106 with the second lighting elements 114 positioned along an end of the base 106 that is distal the universal clamp 104 (not shown). In the illustrated embodiment, the base 106 includes an angled portion 802. In other embodiments, the base 106 is generally planar and the second lighting elements 114 are angled within the base 106.

In some embodiments, each of the first lighting elements 112 and/or the second lighting elements 114 is fanned relative to another of the first lighting elements 112 and/or the second lighting element 114. In some embodiments, one or more of the first lighting elements 112 or the second lighting elements 114 may be multi-functional. For example, the mirror 102 may have high-beam/low-beam modes, turn signals, flashers, and the like. In some embodiments, additional lighting elements (not shown) are included to perform the same or different functions from one or more functions of the first lighting elements 112 and the second lighting elements 114.

Figure 9:
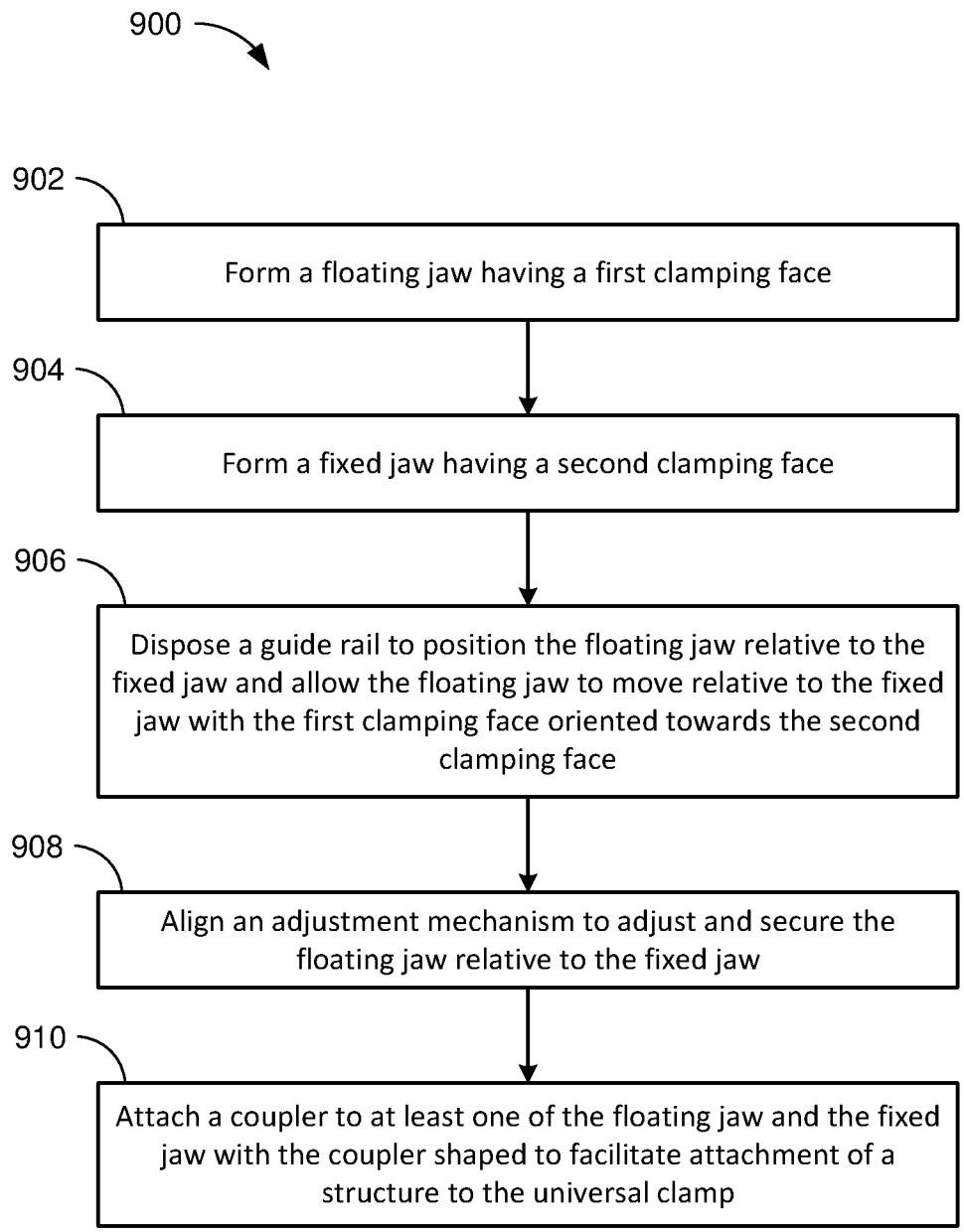
FIG. 9 is a flow chart of one embodiment of a method.

FIG. 9 is a flow chart of one embodiment of a method 900. The illustrated embodiment of the method 900 includes forming 902 a floating jaw having a first clamping face. The method 900 also includes forming 904 a fixed jaw having a second clamping face. The method 900 also includes disposing 906 a guide rail to position the floating jaw relative to the fixed jaw and allow the floating jaw to move relative to the fixed jaw with the first clamping face oriented towards the second clamping face. The method 900 also includes aligning 908 an adjustment mechanism to adjust and secure the floating jaw relative to the fixed jaw. The method 900 also includes attaching 910 a coupler to at least one of the floating jaw and the fixed jaw, the coupler shaped to facilitate attachment of a structure to the universal clamp.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
a universal clamp adjustable to clamp to a plurality of mounting structures each having a different geometry at a clamping location, the universal clamp comprising:
a first jaw having a first clamping face;
a guide coupled to the first jaw;
a second jaw having a second clamping face, the second jaw being adjustably connected to the guide to move relative to the first jaw with the first clamping face oriented towards the second clamping face;
an adjustment mechanism that adjusts and secures the first jaw relative to the second jaw; and
a coupler connected with at least one of the first jaw and the second jaw, the coupler shaped to facilitate attachment of a structure to the universal clamp; and
a mirror light coupled to the universal clamp, the mirror light comprising:
a base comprising a first side and a second side opposite the first side;
a mirror disposed on the first side of the base;
a first lighting element disposed on the second side of the base; and
a second lighting element disposed on the second side of the base and oriented at an angle relative to the first lighting element.

2. The system of claim 1, wherein the mirror light is adjustable relative to the universal clamp with at least one degree of freedom.

3. The system of claim 1, wherein the first lighting element is positioned centrally on the second side of the base and the second lighting element is positioned along an end of the base proximal the universal clamp.

4. The system of claim 1, wherein the first lighting element is positioned centrally on the second side of the base and the second lighting element is positioned along an end of the base distal the universal clamp.

5. The system of claim 1, wherein at least one of the first lighting element or the second lighting element includes a plurality of light emitting diodes.

6. The system of claim 5, wherein each of the plurality of light emitting diodes has at least one of a separate corresponding optic and a separate corresponding electrical control circuit.

7. The system of claim 5, wherein one or more of the plurality of light emitting diodes is angled relative to another of the plurality of light emitting diodes to form a fanned illumination effect in light emitted by the plurality of light emitting diodes.

8. The system of claim 1, wherein the mirror light further comprises a turn signal element disposed in the base.

* * * * *